United States Patent
Zhang et al.

(10) Patent No.: US 11,436,110 B2
(45) Date of Patent: Sep. 6, 2022

(54) DISTRIBUTED DATABASE REMOTE BACKUP

(71) Applicants: Huaxin Zhang, Markham (CA); Ping Chen, Markham (CA); Yuk Kuen Chan, Markham (CA); Sherman Lau, Markham (CA)

(72) Inventors: Huaxin Zhang, Markham (CA); Ping Chen, Markham (CA); Yuk Kuen Chan, Markham (CA); Sherman Lau, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/174,024

(22) Filed: Feb. 11, 2021

(65) Prior Publication Data

US 2022/0253363 A1 Aug. 11, 2022

(51) Int. Cl.
*G06F 11/20* (2006.01)
*G06F 11/14* (2006.01)
*G06F 16/27* (2019.01)

(52) U.S. Cl.
CPC ........ *G06F 11/203* (2013.01); *G06F 11/1451* (2013.01); *G06F 11/1464* (2013.01); *G06F 11/1469* (2013.01); *G06F 16/27* (2019.01); *G06F 2201/80* (2013.01)

(58) Field of Classification Search
CPC .... G06F 11/203; G06F 16/27; G06F 11/1451; G06F 11/1464; G06F 11/1469; G06F 2201/80
See application file for complete search history.

(56) References Cited

U.S. PATENT DOCUMENTS

| 10,474,668 | B2* | 11/2019 | Bensberg | G06F 16/951 |
| 10,565,187 | B2* | 2/2020 | Bensberg | G06F 16/2379 |
| 10,678,812 | B2* | 6/2020 | Bensberg | G06F 16/273 |
| 10,789,131 | B2* | 9/2020 | Rajamani | G06F 16/27 |
| 10,866,949 | B2* | 12/2020 | Bensberg | G06F 16/2379 |

(Continued)

FOREIGN PATENT DOCUMENTS

| CN | 104714836 A | 6/2015 |
| CN | 108073656 A | 5/2018 |

(Continued)

OTHER PUBLICATIONS

Polyzois, C.A. and Garcia-Molina, H. Evaluation of Remote Backup Algorithms for Transaction-Processing Systems. ACM Transactions on Database Systems. vol. 19, No. 3 Sep. 1994.

(Continued)

*Primary Examiner* — Kamini B Patel

(57) ABSTRACT

Generating, by a first primary site that is included in a group of primary sites of a distributed database system, a commit action redo log message for a commit action performed by the first primary site for a first database transaction, the commit action redo log message including a transaction ID for the first database transaction and a transaction order indicator that represents an order of database transactions in a group of database transactions performed at one or more primary sites of the group of primary sites; and sending, by the first primary site, the commit action redo log message, for a corresponding first standby site that backs up the first primary site.

20 Claims, 10 Drawing Sheets

(56) References Cited

U.S. PATENT DOCUMENTS

| | | | |
|---|---|---|---|
| 2009/0049054 A1* | 2/2009 | Wong | G06F 16/27 |
| 2009/0172142 A1* | 7/2009 | Hanai | G06F 15/16 |
| | | | 709/223 |
| 2016/0196322 A1 | 7/2016 | Xu et al. | |
| 2016/0246864 A1* | 8/2016 | Boldt | G06F 9/466 |
| 2016/0371319 A1* | 12/2016 | Park | G06F 16/951 |
| 2018/0060181 A1* | 3/2018 | Rajamani | G06F 11/1451 |
| 2018/0121487 A1* | 5/2018 | Shacham | G06F 16/2365 |
| 2018/0137166 A1* | 5/2018 | Bensberg | G06F 16/1727 |
| 2018/0137185 A1* | 5/2018 | Bensberg | G06F 16/273 |
| 2018/0137210 A1* | 5/2018 | Bensberg | G06F 16/2379 |
| 2019/0384775 A1* | 12/2019 | Wen | G06F 16/2379 |
| 2020/0012659 A1* | 1/2020 | Dageville | G06F 16/273 |
| 2020/0026609 A9* | 1/2020 | Rajamani | G06F 11/1471 |
| 2020/0183918 A1* | 6/2020 | Bensberg | G06F 16/2379 |

FOREIGN PATENT DOCUMENTS

| | | |
|---|---|---|
| CN | 111694798 A | 9/2020 |
| WO | 2019212714 A1 | 11/2019 |

OTHER PUBLICATIONS

King, R.P. and Halim, N. Management of a Remote Backup Copy for Disaster Recovery. ACM Transactions on Database Systems, vol. 16, No. 2 Jun. 1991.

* cited by examiner

DISTRIBUTED DATABASE REMOTE BACKUP

RELATED APPLICATIONS

This is the first patent application for the claimed subject matter.

TECHNICAL FIELD

The present application relates to data management, in particular to methods and systems for synchronizing data in standby sites with primary sites in a distributed computer system.

BACKGROUND

In data management, a distributed database transaction can be a database transaction that is synchronized among (or is managed in concert with) multiple participating databases, which are distributed among different physical locations. The multiple participating databases of the distributed system can include a plurality of primary databases, each of which corresponds to a primary site, and a plurality of standby or backup databases, each of which corresponds to a standby site. Each standby site corresponds to a primary site and synchronizes to the latest changes that have been made in the primary site. The standby site serves as a slightly stale mirror of the primary site data as the standby site maintains a replicated database that is close to, but not a real-time copy of, the primary site database. Accordingly, recovery of data from the standby site, if and when required, is called asynchronous data recovery.

In order to support data recovery in the event of a failure, each primary site records all changes in redo logs, and the primary site will send redo log updates recording additional database changes to its corresponding standby sites. Once the standby site receives the redo log updates, the standby site applies the received redo log updates, resulting in synchronization with the primary site.

In the case where a primary site fails, the corresponding standby site can be used either to restore the primary site or be promoted to replace the primary site, with minimum latency.

Accordingly, it is desirable to provide a method and system to enable a standby site to mirror changes made to its corresponding primary site accurately to fulfill atomicity and dependency requirements with minimal divergence and maximal parallelism to support an asynchronous data recovery scenario.

SUMMARY

According to a first example aspect is a method that includes: generating, by a first primary site that is included in a group of primary sites of a distributed database system, a commit action redo log message for a commit action performed by the first primary site for a first database transaction, the commit action redo log message including a transaction ID for the first database transaction and a transaction order indicator that represents an order of database transactions in a group of database transactions performed at one or more primary sites of the group of primary sites; and sending, by the first primary site, the commit action redo log message, for a corresponding first standby site that backs up the first primary site.

In some examples of the first aspect, the transaction order indicator includes a vector that comprises a respective log sequence number for each of the primary sites in the group of primary sites, the log sequence number for each of the primary sites corresponding to a commit action performed by the respective primary site.

In examples of one or more of the preceding aspects, the method includes receiving, at the first primary site, the log sequence numbers corresponding to the commit actions performed by other primary sites in the group of primary sites, wherein the log sequence number included in the transaction order indicator for each primary site corresponds to the last commit action performed by the primary site as known to the first primary site.

In examples of one or more of the preceding aspects, the method includes receiving, receiving, by the first primary site, notification of the transaction ID for the first database transaction from a coordinator that assigns incremental transaction IDs to database transactions; and providing, by the first primary site, notification for the coordinator that the first primary site is prepared to commit the first database transaction, wherein the log sequence numbers corresponding to the commit actions performed by the other primary sites in the group of primary sites are received by the first primary site from the coordinator.

In examples of one or more of the preceding aspects, the method includes receiving, at the first standby site, the commit action redo log message and determining based on the log sequence numbers included in the transaction order indicator when to commit the first database transaction.

In some example of the first aspect, the transaction order indicator includes a commit sequence number assigned by a coordinator to the first database transaction that indicates when the first database transaction is committed at one or more of the primary sites relative to other database transactions included in the group of database transactions.

In examples of the preceding aspect, the method includes receiving, receiving, at the first standby site, the commit action redo log message and determining, based on a comparison of the commit sequence number assigned to the first database transaction with commit sequence numbers included in further commit action redo log messages received at other standby sites, when to commit the first database transaction.

In some examples, the comparison comprises comparing the commit sequence number assigned to the first database transaction to a consistent point value, wherein the consistent point value is a minimum commit sequence number of a group that comprises a maximum commit sequence number received at each of the standby sites that correspond to the group of primary sites.

In some examples of the first aspect: when the first database transaction falls below an importance criteria, the transaction order indicator includes a commit sequence number assigned by a coordinator to the first database transaction that indicates when the first database transaction is committed at one or more of the primary sites relative to other database transactions included in the group of database transactions; and when the first database transaction exceeds the importance criteria, the transaction order indicator includes: (i) the commit sequence number assigned by the coordinator to the first database transaction and (ii) a vector that comprises a respective log sequence number for each of the primary sites in the group of primary sites, the log sequence number for each of the primary sites corresponding to a commit action performed by the respective primary site.

According to a second example aspect is a first primary site included in a group of primary sites that participate in database transactions. The first primary site includes a processing system comprising one or more processing units and one or more storage devices storing instructions that are operable, when executed by the one or more processing units, to cause the first primary site to perform operations comprising: generating a commit action redo log message for a commit action performed by the first primary site for a first database transaction, the commit action redo log message including a transaction ID for the first database transaction and a transaction order indicator that represents an order of database transactions in a group of database transactions performed at one or more primary sites of the group of primary sites; and sending the commit action redo log message for a corresponding first standby site that backs up the first primary site.

According to a third example aspect is a method performed at a first standby site that backs up a first primary site in distributed database system that includes a group of primary sites each having respective standby sites, the method comprising: receiving a redo log message at the first standby site in respect of a first transaction performed at the first primary site, the redo log message including a transaction ID for the first transaction and a first transaction order indicator that indicates an order of the first transaction in a group of transactions committed at the group of primary sites; receiving information at the first standby site about transaction order indicators received at other standby sites; and determining, based on the redo log message and the information about transaction order indicators received at other standby sites, when to commit the first transaction at the secondary site.

In some examples of the third aspect, each transaction order indicator includes a vector that comprises a respective log sequence number for each of the primary sites in the group of primary sites, the log sequence number for each of the primary sites corresponding to a commit action performed by the respective primary site.

In some examples of the third aspect, the first transaction order indicator includes a commit sequence number for the first transaction that indicates when the first database transaction was committed at one or more of the primary sites relative to other database transactions included in the group of database transactions, and the transaction order indicators received at the other standby sites each indicate commit sequence numbers for transactions committed at the primary sites that correspond to the other standby sites.

In some examples of the third aspect, a consistent point value is determined, wherein the consistent point value is a minimum commit sequence number of a group that comprises a maximum commit sequence number received at each of the standby sites that correspond to the group of primary sites, wherein determining when to commit the first transaction at the secondary site is based on comparison of the commit sequence number for the first transaction with the consistent point value.

According to a fourth example aspect is a first standby site included in a group of standby sites that back up a group of primary sites that participate in database transactions. The first standby site includes a processing system comprising one or more processing units and one or more storage devices storing instructions that are operable, when executed by the one or more processing units, to cause the first standby site to perform operations comprising: receiving a redo log message at the first standby site in respect of a first transaction performed at the first primary site, the redo log message including a transaction ID for the first transaction and a first transaction order indicator that indicates an order of the first transaction in a group of transactions committed at the group of primary sites; receiving information at the first standby site about transaction order indicators received at other standby sites; and determining, based on the redo log message and the information about transaction order indicators received at other standby sites, when to commit the first transaction at the secondary site.

According to a fifth example aspect is a computer readable medium that stored instructions that when executed by a processing unit of a distributed database site can configure the site to perform one or more of the above methods.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods and systems for managing asynchronous data recovery in a distributed computer system, in order to maintain database consistency and integrity between a primary site and a corresponding standby site. In this disclosure, a site can refer to a database instance, which is a set of software implemented memory structures that are used to manipulate data in a database. A database can refer to a set of files that store data and metadata. In some examples, database files may be written to a persistent read/write storage such as a disc storage. A site (e.g., database instance) may be implemented by a combination of a processing system and machine readable instructions executable on the processing system. In some examples, each site may be hosted by a single processing system such as a computer. In some examples, multiple sites may be hosted on a single processing system.

In this disclosure, a database transaction refers to a logical, atomic unit of work that is independently executed for data retrieval or updates, and can include one or more actions (also known as operations) that implement one or more changes to a database. In this regard, a database transaction includes an indivisible and irreducible series of actions that must all be completed. This means that in order for participating sites to complete and save a transaction (also referred to as "commit") all of the actions in the transaction must be completed. Otherwise, the transaction must be aborted and all of the actions rolled back. Examples of actions that can be performed by a site include actions that enable a site to store, modify, delete and retrieve data.

Figure 1:
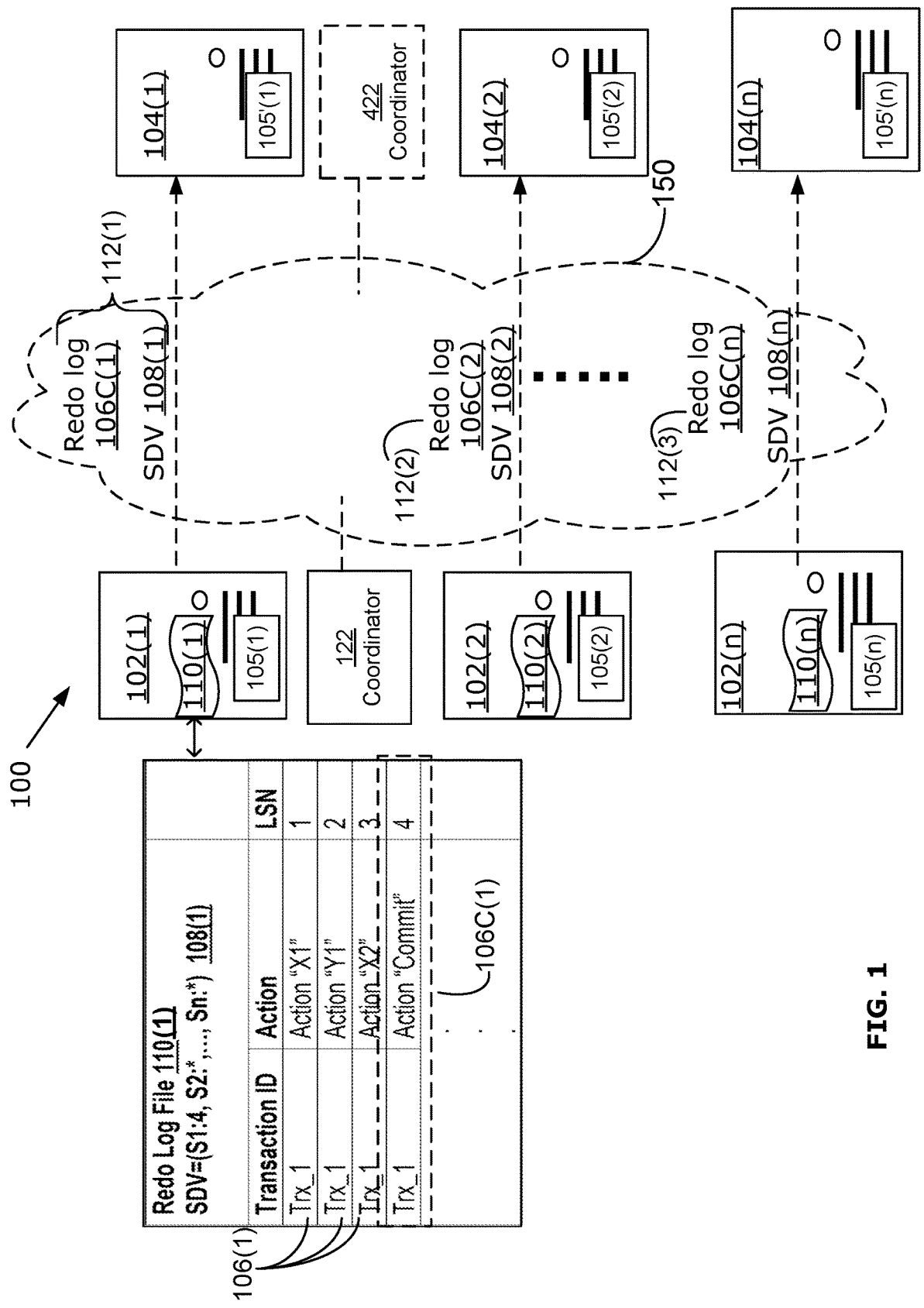
FIG. 1 illustrates an example schematic diagram of a distributed computer system.

FIG. 1 presents an example of a distributed computer database system 100 according to aspects of the present disclosure. Distributed computer database system 100 includes a plurality of primary sites 102(1) to 102(n) (generically referred to collectively as primary sites 102 or individually as a primary site 102(i)) and a plurality of standby sites 104(1) to 104(n) (generically referred to collectively as standby sites 104 and individually as a primary site 104(i)). Each primary site 102(i) has a corresponding standby site 104(i). Each primary site 102(i) manages a database 105(i), and each corresponding standby site 104(i) manages a duplicate database 105'(i) that is a copy of its respective primary site 102(i)'s database 105(i). In some examples, when a primary site 102 grows too large it may be split into multiple primary shards. A used in this disclosure, "when" can refer to a time when circumstances cause a thing to occur, which may not necessarily be a particular clock time or a particular chronological point or interval. Each primary shard will have its respective standby shard. For the present disclosure, a "shard" can also be considered to be a "site". Primary sites 102 and standby sites 104 may be connected to a communication network system 150 that may include one or more networks including, for example, the Intranet, one or more intranets, wired networks, wireless networks, virtual private networks, and combinations thereof.

In example embodiments, transactions performed by primary sites 102 are managed by a transaction coordinator 122. A transaction coordinator 122 can be a module that is implemented by a combination of machine-readable instructions executable on a processing system. In some examples, different coordinators 122 may be used to manage different transactions or groups of transactions. In some examples, a coordinator 122 may be co-hosted on a processing system with a primary site 102.

Each primary site maintains a respective redo log file 110 in a defined format which logs a history of all changes made to the primary site 102(i)'s database 105(i). A primary site 102(i) is configured to generate (produce, in any fashion) a new redo log 106(i) for each action that the site 102(i) performs that changes its database 105(i). Every time the primary site 102(i) generates a new redo log 106(i), it adds a copy of the redo log 106(i) to its redo log file 110 and also provides a redo log message 112(i) that includes a copy of the redo log 106(i) for its corresponding standby site 104(i). Standby site 104(i) performs the action included in the redo log 106(i) to manage duplicate database 105'(i). An illustrative example of a redo log file 110, corresponding to primary site 102(1), is shown in FIG. 1. The redo log file 110 includes a plurality of successively generated redo logs. Each transaction ends with a redo log that is recorded for a "Commit" action, with an illustrative commit action redo log 106C(1) being surrounded by a dashed block in FIG. 1. As shown, each redo log 106(1) identifies a respective action (a "commit" action in the case of commit action redo log 106C(1)) FIG. 1), a transaction ID (e.g. Trx_1) that identifies the transaction that the action is performed by primary site 102(1) in respect of, and a log sequence number LSN (e.g., LSN=4). In example embodiments, transaction ID's are incrementally assigned by a coordinator 122 each time a new transaction is received. An LSN is incrementally assigned by the primary site 102(i) to each redo log 106(i) that it generates. Accordingly, the LSN values for each primary site 102(i) are locally generated values, with a new LSN value being generated for each redo log 106(i) (including commit action redo log (106C(i)) generated at the site.

In examples, each primary site 102(i) maintains a local transaction order indicator, for example, a site dependency vector (SDV) 108(i), that it stores in conjunction with redo log file 110. A transaction order indicator represents (colloquially, stands for or corresponds to), an order (sequence) of database transactions in a group of database transactions. A vector is an ordered set or array of numbers, typically with significance attached to the order in which the numerical values appear in the vector, as well as the numerical values themselves. The SDV 108(i) is used to track the current (e.g., maximum) LSV values for commit actions performed at the primary site 102(i) and other primary sites 102, thereby providing a indication of the position of each primary site 102 within the transaction log stream. SDV 108(1) includes a slot or element (S1, S2, . . . , Sn) for each of the primary sites 102(1) to 102(n) that participate in at least some transactions included in a global transaction log stream in a distributed computer database system 100. The values that are included in the respective elements (S1, S2, . . . , Sn) of SDV 108(1) identify, based on the current information available to the primary site 102(1), the LSN values of the last commit action redo log 106C(1) to 106C(n) recorded by all primary sites 102(1) to 102(n) in the transaction log stream. For example, vector element S1 can indicate the LSN for the commit action redo log 106C(1) of the last transaction committed by primary site 102(1), vector element S2 can indicate the LSN for the commit action redo log 106C(2) of the last transaction committed by primary site 102(2) (as known to primary site 102(1)), and vector element Sn can indicate the LSN for the commit action redo log 106C(n) of last transaction (as known to primary site 102(1)) committed by primary site 102(n). In an example embodiment, the values of vector elements (S1, S2, . . . , Sn) are each set to the log sequence number (LSN:Trx) of the Commit action of the last known transaction as indicated by the primary site that performed the Commit action. As will be explained in greater detail below, the SDVs 108(1) to 108(n) are used to provide a vector of Lamport-style clocks that sites can use to determine location in the transaction log stream. In example embodiments, the other primary sites 102 that are represented as commit action LSN slots in the SDV of a particular primary site 102(i) may be less than n if the value of n exceeds a threshold. In such cases, the represented primary sites 102 may the sites that are most likely to be involved in a dependent transaction with the primary site 102(*i*). In some examples, the slot assignments in the SDV for a particular primary site may be predetermined by a system administrator.

In example embodiments, when a primary site 102(*i*) performs an action in respect of a transaction, the action is recorded in a respective redo log 106(*i*) at the primary site's redo log file 110 and a redo log 106(*i*) is sent, as part of a redo log message 112(*i*), to its corresponding standby site 104(*i*). In example embodiments, the primary site's SDV 108(*i*) is updated whenever the primary site 102(*i*) becomes aware that a new commit action has been performed by itself or another primary site. In example embodiments, primary site 102(*i*) includes its current SDV 102(*i*) as part of the redo log message 112(*i*) every time the primary site 102(*i*) reports a new commit action redo log 106C(*i*). A redo log message 112(*i*) that reports a new commit action redo log can be referred to as a "commit action redo log message". In some alternative examples, the current SDV 108(*i*) may be included with every redo log message 112(*i*) sent to standby site 104(*i*).

Once a standby site 104(*i*) receives a redo log 106(*i*) from its respective primary site 102(*i*), the standby site 104(*i*) can perform the action specified in the redo log 106(*i*) to update duplicate database 105'(*i*), and to update its own copy of a redo log file, to keep synchronization with the primary site 102(*i*).

At some point, standby sites 104 that participate in a transaction must make a decision to commit the transaction or rollback the transaction. In this regard, a plurality of criteria are required in order for each of the participating standby sites 104 to determine whether to rollback or commit, including an atomicity requirement and a dependency requirement. The atomicity requirement means that all of the actions in a transaction must be performed for a standby site 104 to commit the transaction, or else the actions of the transaction must all be rolled back. The dependency requirement means that a second transaction that depends on a first transaction will not be committed at the standby site 104(*i*) unless the standby site 104(*i*) can confirm that the first transaction has been committed.

The present disclosure describes systems and methods for tracking transaction dependency relationships among standby sites 104. In situations where a standby site 104(*i*) does not know progress of actions performed by other standby sites 104 with respect to dependent transactions, uncertainties can arise that make it challenging for a standby sites 104(*i*) to determine when and whether to commit transactions described in the redo log messages 112(*i*) the standby site has received. The uncertainties can lead to a large recovery point objective (RPO) and a long recover time objective (RTO) for the standby sites 104 in order to keep data in the standby sites 104 consistent with changes that occur in the corresponding primary sites 106. A large RPO may lead to substantial divergences between a primary site and the corresponding standby site, and a long RTO may cause backup with less parallelism at standby sites. Furthermore, the long RPO and RTO may in turn cause inaccuracies and introduce errors for recovering data in a distributed computer database system when primary sites go down or otherwise fail. Accordingly, in at least some examples the methods and systems disclosed herein may be used to improve efficiency and accuracy of distributed database systems.

According to example embodiments, in order to mitigate against uncertainties that can arise as a result of unknown inter-transaction dependencies, the above mentioned the site dependency vector SDV 108(*i*) is used as a mechanism for tracking transaction dependencies among backup sites 104.

Figure 2A:
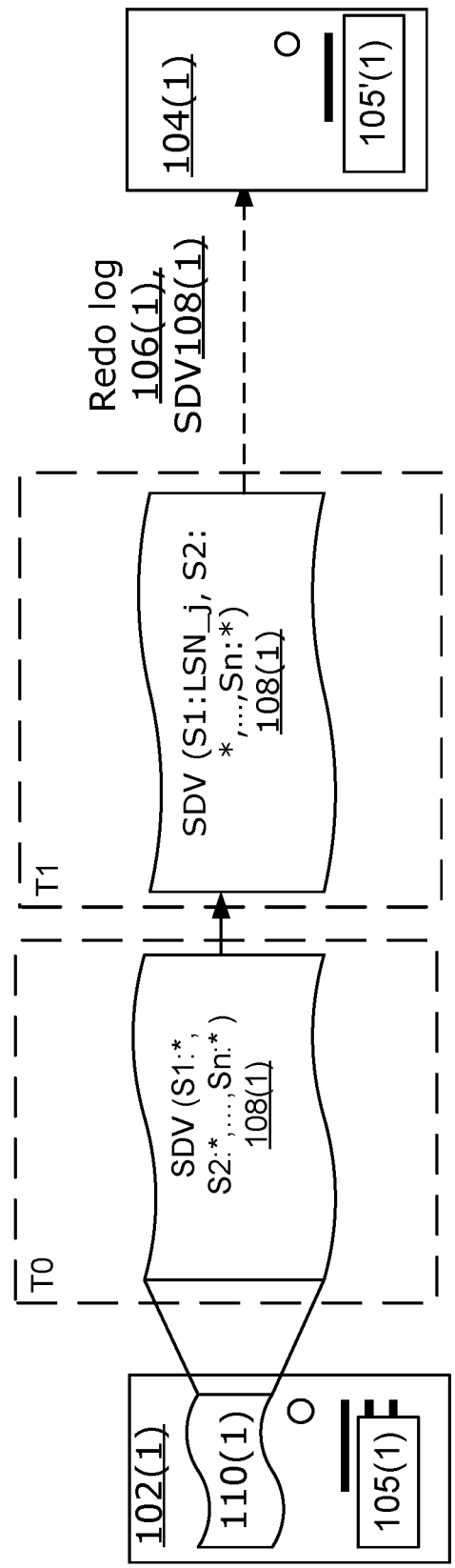
FIG. 2A shows an example of redo logs each including log sequence numbers (LSNs) within a succession dependency vector (SDV) in a scenario where a single transaction is committed at a primary site, according to an example embodiment.

FIG. 2A illustrates a simplified example of the updating of a site dependency vector (SDV) 108(1) of a primary site 102(1) in respect of a single-site transaction Trx_1 that consists of a one or more database change actions that are all performed at the primary site 102(1). The dashed block T0 illustrates the SDV 108(1) stored as part of log update file 110 at time T0 before primary site 108(1) commits transaction Trx_1. As noted above, SDV 108(1) will include n elements (S1:*, S2:*, . . . , Sn:*), with elements S1 to Sn representing, from the perspective of the primary site 102 (1), the last known transaction committed by itself and the other primary sites 102(2) to 102(*n*), respectively. The value included in each of elements S1 to Sn, respectively, is the primary site 102(1)'s knowledge of the local LSN of last transaction for which a commit action was performed at each of the primary sites 102(*i*) to 102(*n*), respectively. Thus, the element values in SDV 108(1) can provide information about committed transaction offsets in an overall log stream for distributed computer database system 100 from the perspective of primary site 102(1). In the present example, "*" may denote a null value, indicating that no prior transactions are known at time T0.

The dashed block T1 illustrates the SDV 108(1) at time T1 after the primary site 102(1) has performed all database change actions that are part of transaction Trx_1 and commits transaction Trx_1. In particular, the SDV element S1 that corresponds to the primary site 102(*i*) has been set to S1:LSN_j, where "LSN_j" is a log sequence value (LSV) corresponding to the commit action for transaction Trx_1. By way of example, if SDV 108(1) vector element value S1="0" at the start of transaction Trx_1, and Trx_1 included 2 database change actions at primary site 102(1) followed by a Commit action at primary site 102(1), then the LSN value would be incremented by 3 integer units such that S1:LSN_j=S1:3 (assuming no intervening actions in respect of other transactions). In the example of FIG. 2A, primary site 102(1) is not aware of any other transactions committed by other primary sites, and so all of the other SDV element values S2 to Sn retain their previous values (e.g., "*" or "null" in the illustrated example).

In an example real-time-update embodiment, when performing the respective actions that are included in transaction Trx_1, the primary site 102(1) will prepare and send a respective redo log 106(1) to its standby site 104(1) on an action-by-action basis. When the primary site 102(1) performs a commit action (i.e., when it writes the transaction Trx_1 to a non-transitory database storage such as a disc), it immediately provides a commit action redo log 106C(1) of the commit action for standby site 104(1). In example embodiments, the current updated SDV 108(1) will be included with the redo log message 112(1) that includes the commit action redo log 106C(1).

In some examples, primary site 102(1) may send redo log message 112(1) (including commit action redo log 106C(1) and SDV 108(1)) in a network communication that is addressed to corresponding standby site 104(1). In some examples, primary site 102(1) may send redo log message 112(1) to an intermediate central storage site for retrieval by standby site 104(1). At the corresponding standby site 104 (1), once the redo log message 112(1) (including commit action redo log 106C(1) and updated SDV 108(1) (e.g., (S1:LSN_i, S2:*, Sn:*)) has been received, the corresponding standby site 104(1) will determine whether the transaction Trx_1 can be committed at the standby site 104(1) based on the content of SDV 108(1) (e.g., (S1:LNS_i, S2:*, ..., Sn:*)) in the received SDV 108(1).

In this regard, the standby site 104(1) analyzes all the components (e.g., "S1: LSN_i", "S2:*") included in the received SDV 108(1) and finds out that a value (e.g., S1:LSN_i) corresponding to the primary site S1 is greater than 0, and the values (e.g., *) corresponding to the other primary sites 102(2) to 102(n) are null ("*"). Standby site 104(1) will hold off committing transaction TRX_1 until it receives information indicating that the LSN values for other sites are at least equal to LSN_i. The LSN information can come from one of two sources: either in the SDV 108(1) received from the primary site 102(1), or by direct polling of the other standby site 104(2) by the standby site 104(1). When standby site 104(1) polls other sites standby sites 104(2), it will update each of the values in the respective SDV 108(1) slots to the highest known LSN for each of the respective sites.

In this regard, as respective commit action redo logs 106(i) including a respective SDV 108(i) are provided by each of the primary sites 102(i) for their respective standby sites 104(i), each standby site 104(i) can determine when and if transactions should be committed based on values of LSNs included in the received SDVs, in order to support a possible future asynchronous data recovery. Such a method may help to improve accuracy of performing asynchronous data recovery at standby sites by using the vector as a Lamport clock in the received redo log, which may in turn lead to reduced RPO.

Figure 2B:
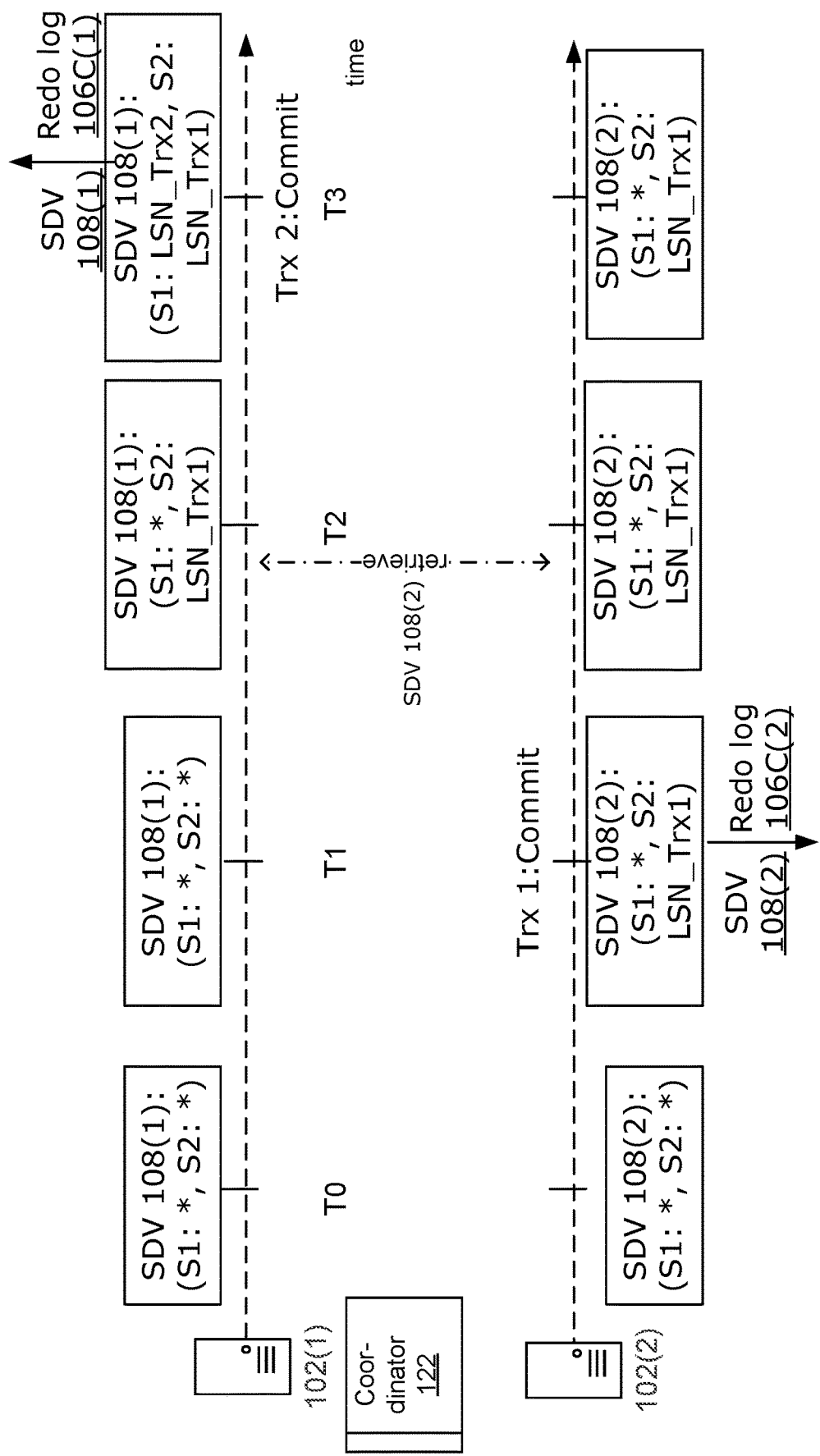
FIG. 2B shows an example of SDVs in a scenario where a plurality of dependent transactions are committed at a plurality of primary sites according to an example embodiment.

An example will now be described in the context of a multi-site transaction, for the case where the number n of primary sites n=2. In this regard, FIG. 2B illustrates an example of using SDV vectors 108(1), 108(2) as Lamport clocks with respect to a first transaction Trx1 and a second Transaction Trx2. FIG. 2B shows the SDV vectors 108(1) and 180(2) for two primary sites 102(1), and 102(2), respectively, at different successive time periods, namely time T1, ..., T3, which T1 refers to a duration of time that proceeds time T2, etc. At time T0, both the primary sites 102(1) and 102(2) are initialized, and their respective initialized SDV 108(1), 108(2) are populated with null values, denoted as (S1:*, S2:*).

Instructions for a first transaction arrive at coordinator 122, which assigns an incremental transaction ID, "Trx_1" to the first transaction. First transaction Trx_1 is a single site transaction that includes actions performed at primary site 102(2) (e.g., add 10 books to site 2 inventory) and no actions at primary site 102(1). By time T1, all database change actions of first transaction Trx_1 are completed, and respective redo logs have been sent to its standby site 104(2). Primary site 102(2) performs a commit action for first transaction Trx_1, and updates its SDV 108(2) to include the local LSN (denoted as LSN_Trx1) generated by primary site 102(2) for the commit action log 106C(2) for first transaction Trx1. Thus, at time T1, SDV 108(2) can be denoted as: (S1:*, S2:LSN_Trx1). The component "S2:LSN_Trx1" of the vector (S1:*, S2:Trx1) identifies the LSN number of the last commit action performed by primary site 102(2). Primary site 102(2) sends a redo log message 112(2) including commit action redo log 106C(2) and the current SDV 108(2) (S1:*, S2:Trx_1), to its respective standby site 104(2).

Coordinator 122 receives instructions for a second transaction and assigns an incremental transaction ID, "Trx_2" to the second transaction. In the illustrated example, the second transaction Trx_2 includes a database change action (e.g., add 5 books to site 1 inventory) that requires a change to the database of primary site 106(1), as well as a retrieve action (e.g., does site 2 already have at least 5 books?) that requires a retrieval of information from the database of primary site 106(2). In this regard, second transaction Trx_2 includes a condition that the change action will only be performed at primary site 102(1) if the retrieve action response from primary site 102(2) meets a defined criteria (e.g., only add 5 books to site 1 inventory if site 2 already has at least 5 books).

Prior to time T2, coordinator 122 notifies primary site 102(1) of the incremental transaction ID for second transaction (i.e., Trx_2). During time T2, primary site 102(1) provides a request for information from primary site 102(2) and receives a response from primary site 102(2). In at least some example's, the request and response is facilitated by coordinator 122. Furthermore, as part of the response, the primary site 102(1) also receives a current copy of the SDV 108(2) for the primary site 102(2). The primary site 102(1) updates its own SDV 108(1) based on information included in the SDV 108(2) received from primary site 102(2) by doing an element by element comparison and updating each element to the largest LSN value. In the illustrated example, the entry "S2:LSN_Trx1" in SDV 108(2) will have a larger offset value in the transaction log stream value than the "null" value "S2:*" currently stored in the element location of SDV 108(1) that corresponds to primary site 102(2). Accordingly, primary site 102(1) will update its own SDV 108(1) to (S1:*, S2:LSN_Trx1).

At time T3, all retrieval and change actions of second transaction Trx_2 are completed, respective redo log messages have been sent to secondary site 102(1), and primary site 102(1) performs a commit action for second transaction Trx2, and updates its SDV 108(1) to include the LSN for the commit action it has performed in respect of second Transaction Trx_2. Thus, at time T3, SDV 108(1) can be denoted as: (S1:LSN_Trx2, S2:LSN_Trx1). The component "S1:LSN_Trx2" of the vector (S1:LSN_Trx2, S2:LSN_Trx1) identifies the local LSN of the last commit action by primary site 102(1). Primary site 102(1) also provides, for its respective standby site 104(1), a redo log message 112(1) that includes commit action redo log 106C(1) for transaction Trx_2, along with the SDV 108(1) (S1:LSN_Trx2, S2:LSN_Trx1).

As the second primary site 102(2) does not perform any actions that require a change to its database or redo log from time T1 to time T3, the SDV 108(2) of second primary site 102(2) remains the same in the example of FIG. 2B after time T1 (i.e., at times T1, T2 and T3, SDV 108(2)=(S1:*, S2:LSN_Trx1)

With respect to first and second corresponding standby sites 104(1) and 104(2), the standby sites 104(1) 104(2) respectively receive the updated SDVs 108(1) and 108(2) provided at times T3 and T1 respectively.

Upon receiving the commit action redo log 106C(2) that is provided by its corresponding primary site 102(2) at time T1, the standby site 104(2) can compare the newly received SDV 108(2) (e.g., (S1:*, S2:LSN_Trx1)) with its existing SDV (e.g., (S1:*, S2:*)) and determine that the corresponding LSN value for its primary site 102(2) has changed from "*" to "LSN_Trx1", and that no other values in the SDV have changed. After time T3, if standby site 102(2) polls standby site 104(1) it will determine that the current SDV vector 108(1) is (S1:LSN_Trx2, S2:LSN_Trx1), and update its own SDV vector accordingly. Assuming that the value of LSN_Trx1 is less than or equal to LSN_Trx2, then standby site 102(2) will determine that it can commit transaction Trx1.

Accordingly, the respective SDVs act as a form of vector clocks that enable standby sites 102 to determine if the transactions that they are to backup are dependent on other transactions, and if those other transactions have been successfully committed. This can support data recovery by keeping the backup sites 104 in close alignment with their corresponding primary sites. The SDVs 108 use relatively small amounts of memory and transmission resources (particularly if sent only with commit action redo logs) to track transaction dependencies across multiple sites, and thus have low storage space requirements. In at least some applications, the use of SDVs enables the computer resources used in system 100 to ensure accurate recovery at the standby sites to be optimized.

Figure 3:
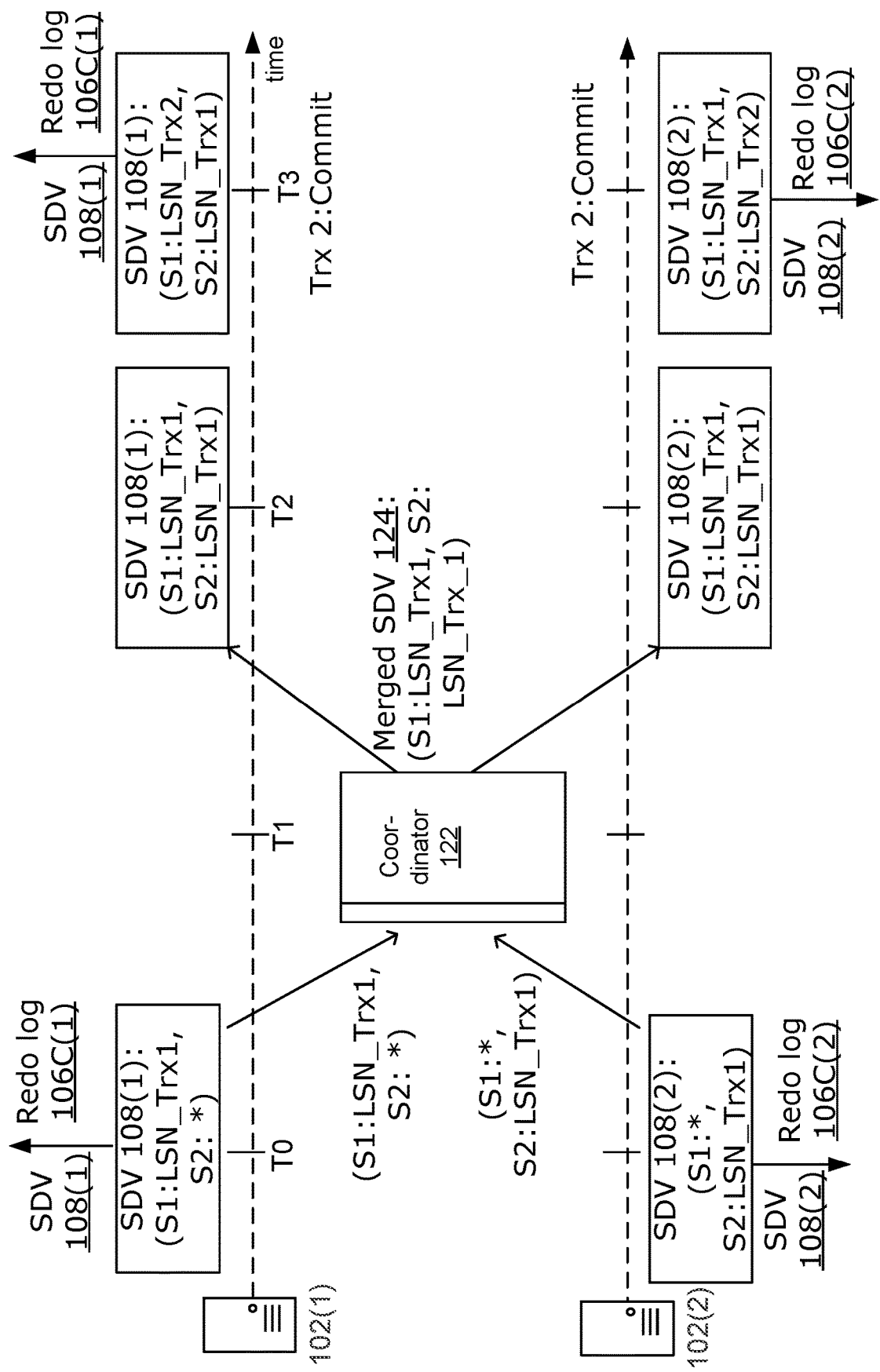
FIG. 3 illustrate san example of SDVs in a scenario where a transaction with two-phase commit protocol (2PC) is committed on a plurality of primary sites according to an example embodiment.

Reference is now made with respect to FIG. 3, which shows an example of a transaction Trx2 that requires change actions on a plurality of primary sites 102(1), 102(2), in accordance with example embodiments.

A transaction that commits on a plurality of primary sites (e.g., a cross-store transaction) typically relies on a two-phase commit protocol (2PC), which requires computer implemented coordinator 122 to coordinate the actions of the sites that participate in the transaction. A 2PC transaction includes a Prepare phase and a Commit phase. In the Prepare phase, participants (e.g., the plurality of primary sites) perform their respective actions without writing the results to the persistent database storage (e.g., a disc), including all necessary steps to prepare resources for committing the transaction, and then notify coordinator 122. In the Commit phase, based on received prepare notifications (e.g., voting) from the participants, the coordinator decides whether to commit (if all participating sites have voted "yes") or abort the transaction, and notifies the decision to all the participants. The participants then implement the decision (e.g., commit or abort the transaction) with the prepared resources. In some examples, in distributed computer database system 100, a network node is designated as the coordinator 122 (which may also be a primary site, or a different site) and the plurality of primary sites associated with the transaction are designated as participants.

An illustrative 2PC transaction Trx2 involving two primary sites 102(1) and 102(2) and a coordinator 122 is presented in FIG. 3A. Prior to time T0, both primary sites have respectively committed a prior transaction Trx1, but are unaware that the other has committed transaction Trx1. Accordingly, the SDV 108(1) for primary site 102(1) is (S1:LSN_Trx1, S2:*), and the SDV 108(2) for primary site 102(2) is (S1:*, S2:LSN_Trx2). These SDV's 108(1) and 108(2) have previously been provided to the first and second standby sites 104(1), 104(2), respectively, when the transaction Trx1 was committed by first and second primary sites 102(1) and 102(2). At time T0, first primary site 102(1) has prepared the resources that it will need to execute transaction Trx2 and has performed, in a buffer, all actions included in the transaction Trx2 with the exception of the commit action. Redo logs 106(1) have been sent to first standby site 104(1) in respect of each of the pre-commit actions. The first primary site 102(1) also provides notification to coordinator 122 that it has prepared transaction Trx2, and also provides its current SDV vector 108(1) (S1: LSV_Trx1, S2:*) to coordinator 122.

Similarly, second primary site 102(2): prepares transaction Trx2 and provides coordinator 122 with notification that it has prepared transaction Trx2 and provide coordinator 122 with a copy of SDV vector 108(2) (S1:*, S2: LSV_Trx1).

Once the coordinator 122 receives notifications for all the primary sites 102(1), 102(2) that are participating in transaction Trx2, the coordinator 122 decides whether the primary sites have collectively voted to commit the transaction Trx2 or abort the transaction 2. If coordinator 122 determines that transaction Trx2 is to be committed, the coordinator 122 extracts a respective maximum commit action SLN value for each primary site from its respective slot location in each SDV 108(1), 108(2) and merges all the extracted maximum commit action LSN values into a merged SDV 124, represented as (S1:LSN_Trx1, S2:LSN_Trx1) in FIG. 3. It will be noted that S1:LSN_Trx1 will be the local LSN generated by primary site 102(1) for the commit action corresponding to transaction Trx1 and S2:LSN_Trx1 will be the local LSN generated by primary site 102(2) for the commit action corresponding to transaction Trx1, and accordingly these two LSN values may not be equal, but will be representative of where each of the respective primary sites 102(1) and 102(2) are in terms of committing transactions included within a group of successive transactions (e.g. a transaction stream). The coordinator 122 provides a message for the first and second primary sites 102(1), 102(2) that: (i) informs the sites to respectively proceed with committing transaction Trx2, and (ii) includes a copy of the merged SDV 124. After receiving the message (for example, at time T2), each primary site 102(1) and 108(2) updates its respective SDV 108(1) and 108(2) based on the merged SDV 124. For example, after the update, both the vectors 108(1), 108(2) are updated to be consistent with the merged SDV 124, (S1:LSN_Trx1, S2:LSN_Trx1).

Each primary site 102(1), 102(2) then enters the Commit phase and commits transaction Trx2 (e.g., writes the transaction to disc). Upon completion of the Commit phase (for example, at time T3), each primary site 102(1), 102(2) respectively: (i) generates a respective commit action redo log 106C(1), 106C(2) for the Commit action for transaction Trx2; (ii) updates its respective SDV 108(1), 108(2) to include the LSN from the Commit update log for transaction Trx2; and (iii) provides a respective redo log message 110(1), 110(2) (including, respectively, commit action redo logs 106C(1), 106C(2) and the updated SDVs 108(1), 108(2)) for its respective standby site 104(1), 104(2). In the case of the primary site 102(1), at time T3 the updated SDV 108(1) will be: (S1:LSN_Trx2, S2:LSN_Trx1), indicating primary site 102(1)'s current knowledge that transaction Trx2 has been committed at primary site 102(1). In the case of the primary site 102(2), at time T3 the updated SDV 108(2) will be: (S1:LSN_Trx1, S2:LSN_Trx2), indicating primary site 102(2)'s current knowledge that transaction Trx2 has been committed at primary site 102(2).

In the absence of any failures, standby site 104(1) will receive SDV 108(1) (S1:LSN_Trx2, S2:LSN_Trx1); standby site 104(2) will receive SDV 108(2) (S1:LSN_Trx1, S2:LSN_Trx2). If the redo logs and SDV's are received as expected, the transaction Trx2 will be carried out at the standby sites 104(1), 104(2), keeping the standby sites and databases closely aligned with the primary sites and databases. If, however, the SDV's are not received or include LSV values that are lower than expected, either standby site 104(1), 104(2) can notify a coordinator site that will then make a determination whether to abort, or take some other action (e.g., wait) with respect to the transaction Trx2.

In the above embodiments, each of group of primary sites 102 employs a respective SDV 108(i) as a transaction order indicator to track the respective positions or offsets of the commit actions of a group of interacting primary sites 102 in a transaction stream. As noted above, each site's SDV 108(i) includes a respective value element for each primary site 102(i) in the group of interacting primary sites 102. Each primary site 102(i) tracks its own position in the transaction stream by setting its own corresponding commit action LSN in its SDV 108(i) to the LSV to the last commit action recorded in the commit action redo log 106C(i) of the primary site 102(i). Each primary site 102(i) tracks the own position in the transaction stream of the other primary sites 102 by setting the value elements in its SDV 108(i) for the other primary sites 102 based on the most recent site transaction stream position information received in respect of the other primary sites 102. This transaction stream position information may be acquired indirectly from the other primary sites 102 through a coordinator 122 (for example, in the case of 2PC transaction of FIG. 3A) or, in some examples, directly from other primary sites 102 (for example, in the case of coordinator-free transaction of FIG. 2B). In examples, whenever a primary site 102(i) sends a redo log 106(i) in respect of a commit action to its backup site 104(i), it includes the latest version of its SDV 108(i).

At the corresponding standby sites 104, the received SDVs can be used to verify that site backup among the multiple sites is occurring in such a way as to meet transaction dependency requirements with minimal divergence between the primary sites and the standby sites. In at least some examples, use of such a Lamport clock-style synchronization of dependencies of the primary sites 102 can eliminate the need for recovery point checks between standby sites. The above described Lamport clock-style synchronization method and system has some overhead as it requires the storage and updating of a SDV at each site. However, in at least some examples, the above described methods and systems enable REDO logs to be applied on standby sites with minimal latency (i.e., small RPO) and minimal RTO, while satisfying atomicity dependency requirements.

Figure 4A:
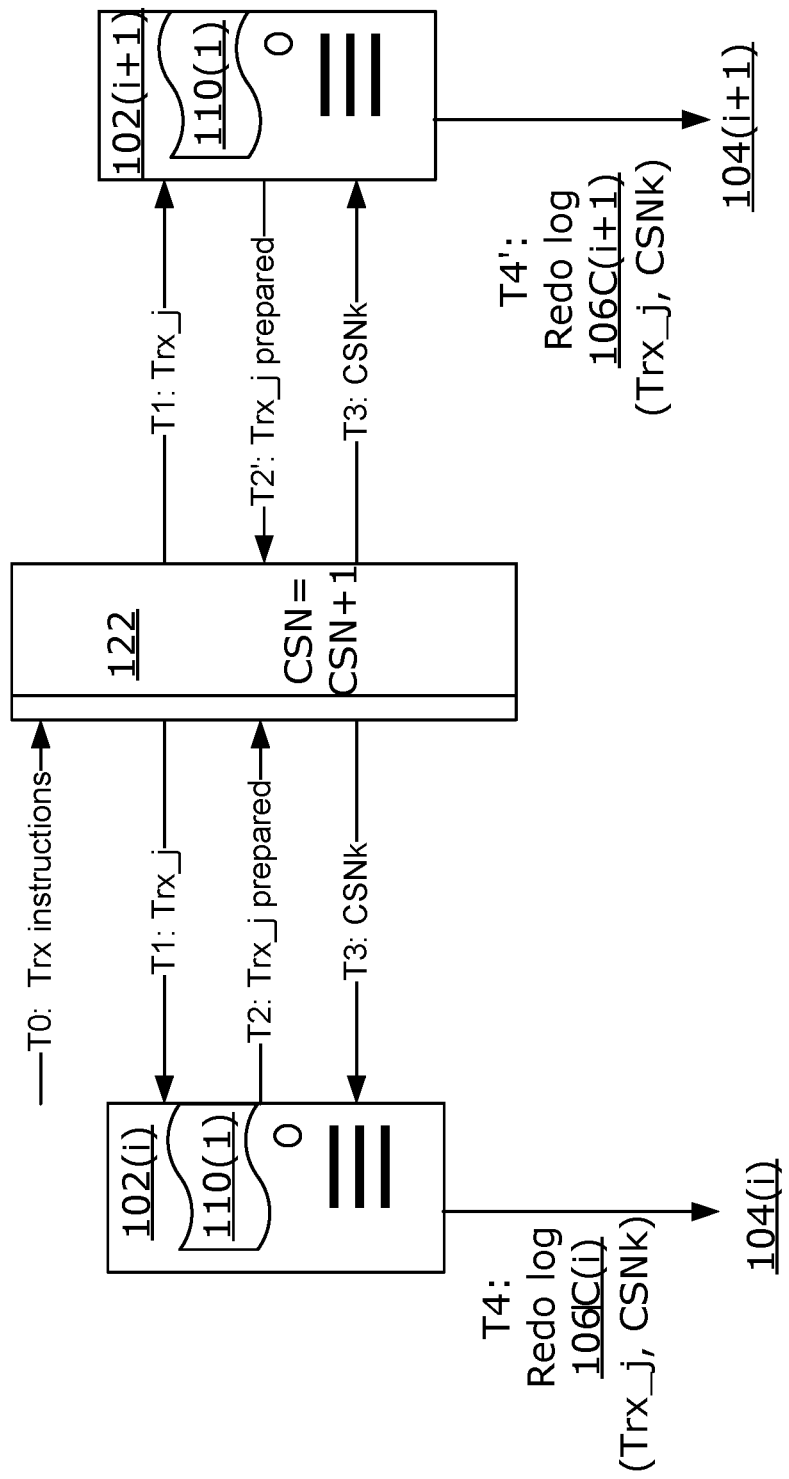
FIG. 4A shows an example redo log including commit sequence numbers (CSNs) in a scenario where a single transaction is committed at a primary site in accordance with one implementation of the present disclosure.

Further examples will now be described that use a commit sequence number (CSN) rather than an SDV of LSNs as a transaction order indicator for tracking transaction stream positions. In the example of FIG. 4A, primary sites 102 co-operate with coordinator 122 to obtain transactions IDs and CSNs for transactions that are committed on primary sites 102. As shown in FIG. 4A, at time T0, coordinator 122 receives instructions regarding a multi-site transaction that involves primary sites 102(i) and 102(i+1). Coordinator 122 assigns an incremental transaction ID (e.g., Trx_j) to the transaction, and notifies provides primary sites 102(i) and 102(i+1) of the assigned transaction ID. The primary sites 102(i) and 102(i+1) respectively perform the prepare phase for transaction Trx_j, and then send respective prepare messages to coordinator 122 (e.g., at times T2 and T2', respectively) indicating that the primary sites 102(i) and 102(i+1) are each prepared to commit transaction Trx_j. Upon receiving notification from all participating primary sites 102 that they are prepared to commit transaction Trx_j, the coordinator 122 increments a global transaction commit sequence number (CSN) to assign a CSN number to the commit transaction Trx_j (e.g. CSN for transaction Trx_j=CSNk).

The coordinator 122 then notifies each primary site 102(i), 102(i+1) that all sites are prepared to commit transaction Trx_j and of the CSN (e.g., CSNk) assigned to the transaction. Upon receiving the commit notification and the CSN for transaction commit transaction Trx_j from the coordinator 122, each participating primary site 102(i), 102(i+1): (i) proceeds with committing transaction Trx_j; (ii) generates respective commit action redo logs 106C(i), 106C(i+1) that is added to its local redo log file 110; and (iii) sends a respective redo log message 112(i), 112(i+1) (each including a respective commit action log record 106(i), 106(i+1) and the CSN value assigned to transaction Trx_j), to its corresponding standby site 104(i), 104(i+1).

As will be explained in greater detail below, the redo log message 110(i) that includes commit action redo log 106C(i) received at standby site 104(i), includes a transaction ID and the CSN for the committed transaction (e.g., Trx_j, CSNk). The standby site 104(i) can compare the CSN information included in commit action redo logs 106C(i) for transactions with CSN information that the standby site 104(i) receives from other standby sites 104 to determine if and when transactions should be committed at the standby site 104(i). Including a CSN and transaction ID pair into redo log messages 110(i) for committed transactions may enable atomicity and dependency requirements to be satisfied accurately. Furthermore, as the coordinator is responsible for coordinating the actions of participating sites, RTO performance may be improved.

Figure 4B:
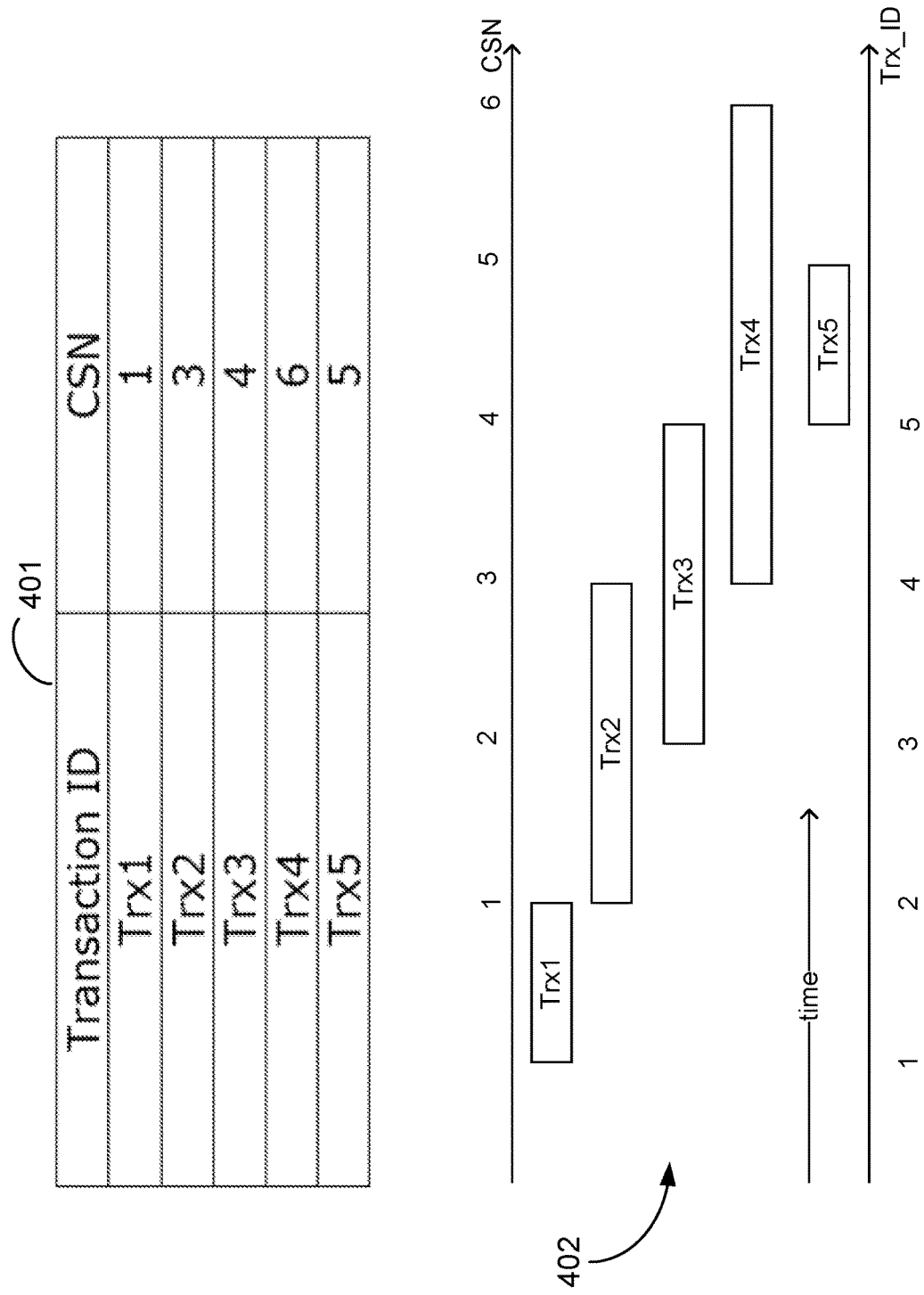
FIG. 4B is an example table and time diagram illustrating assigned relationships between transaction identifier (ID) and commit sequence number (CSN) in accordance with one implementation of the present disclosure.

FIG. 4B is an illustrative example of a table 401 and timing diagram 402 showing different assigned transaction ID/CSN pairs. Every transaction is assigned a unique transaction ID and a unique CSN, with a subsequent committed transaction in a transaction stream having a higher value CSN than an earlier committed transaction. Taking transactions 4 and 5 (transaction IDs Trx4 and Trx5) as an example, a value of 6 is used as a CSN for the transaction 4, and a value of 5 is assigned for the transaction 5. Therefore, if a standby site receives one redo log update that includes a relationship identifying transaction ID Trx4 corresponds to CSN value 6 and the other a redo log update that includes a Trx ID/CNS pair: Trx5:CSN 5, the standby sites can tell that transaction 5 is committed prior to the transaction 4 by comparing values of CSNs (e.g., CSN 6>CSN 5) from the received redo log updates.

In respect of two transactions having dependent relationship (e.g., a second transaction depends on a first transaction), the CSN value of the second transaction will be greater than the CSN value of the first transaction. For example, where a standby site receives a redo log where transaction Trx2 is assigned a CSN with a value of 3, the standby site can assume that the transaction Trx2 will not depend on any other transaction that has a CSN that is larger than 3.

A theorem of atomicity and dependency correctness for a CSN based transaction log stream tracking method can be stated as follows: For a transaction TrxA with a CSN value of X, if every standby site in a group of standby sites has seen a maximum CSN at least as large as X, then the transaction TrxA can be committed and both atomicity and dependency requirements will be met.

Examples of standby site processing using CSN values in the context of a 2PC transaction will now be described with respect to FIGS. 4C and 4D, in which distributed database system 100 includes first, second, and third standby sites 104(1), 104(2) and 104(3).

Figure 4C:
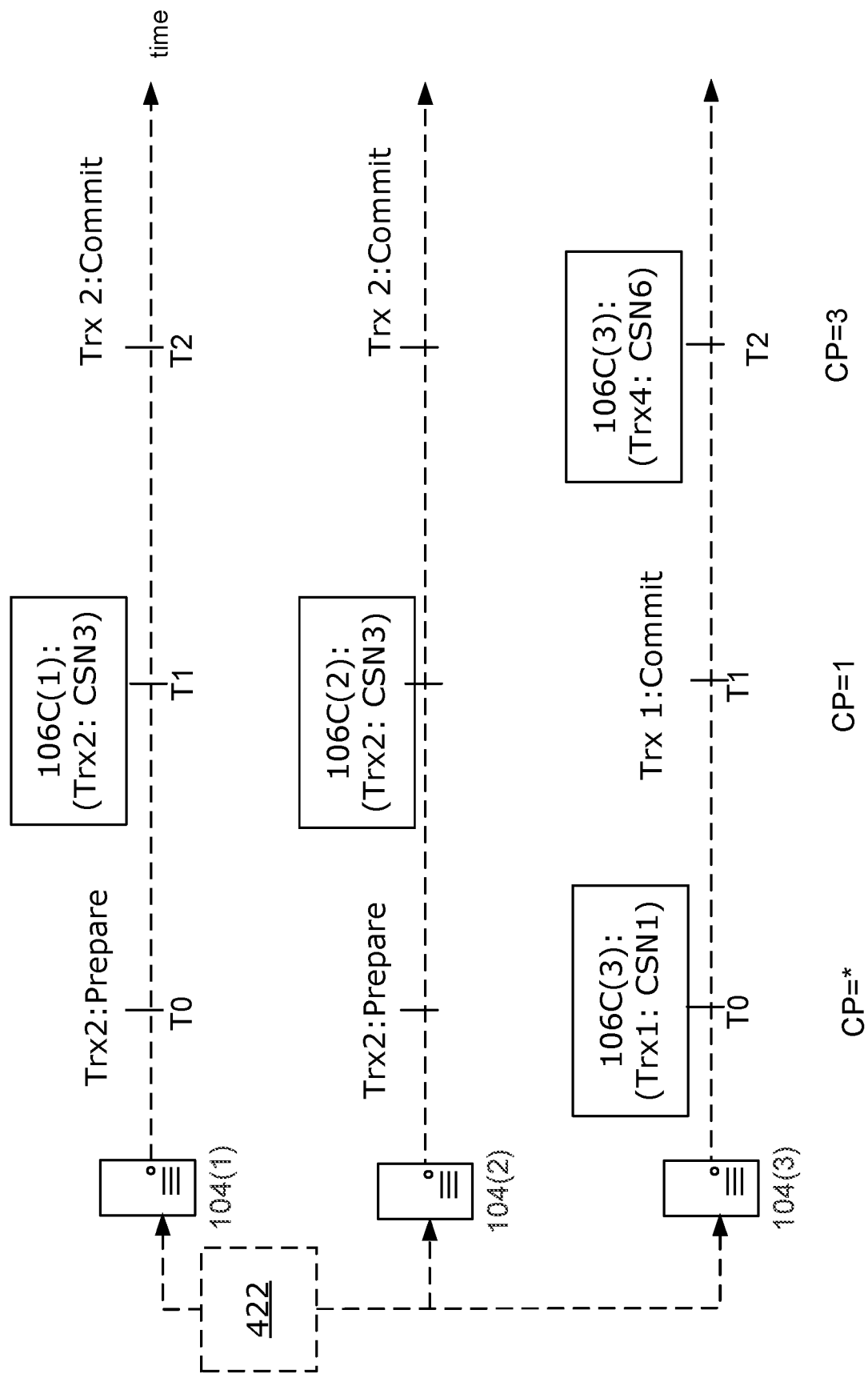
FIG. 4C illustrates an example of redo log updates received at a plurality of standby sites at different times in accordance with one implementation of the present disclosure.

In FIG. 4C, at time T0, first and second standby sites 104(1), 104(2) have respectively received redo logs from first and second primary sites 102(1), 102(2) (not shown in FIG. 4C) indicating actions that are part of the "Prepare" stage for transaction Trx2. Third standby site 104(3) receives a commit action redo log 106C(3) from third primary site 102(3) that includes Trx1 has been committed and assigned CSN value of CNSN1 (e.g., indicating that a first transaction Trx1, assigned CSN1, has been committed at third primary site 102(3)). The first, second, and third standby sites 104(1), 104(2) and 104(3) all keep track of the transaction IDs for which they have respectively received commit action redo logs and the CSN values assigned to those transactions.

Furthermore, the each of the first, second, and third standby sites 104(1), 104(2) and 104(3) can learn from the other standby sites 104(1), 104(2) and 104(3) what the maximum CSN value is that each of the other standby sites has been made aware of. In different examples, communication of this CSN information between standby sites 104(1), 104(2) and 104(3) can occur through one or more of: (i) as part of standby site-to-standby site communications that occurs as part of a transaction; (2) a polling or reporting mechanism where standby-sites poll each other or report to each other to determine the maximum CSN values that each has seen; and/or (3) through a standby coordinator 422 that may be present in some examples for collecting and disseminating information among the standby sites.

In example embodiments, based on its own maximum CSN value, and the maximum CSN value information that it receives it respect of the other standby sites, each standby site 104(i) can determine the minimum of the maximum CSN values that all of the standby sites 104(1) to 104(3) have each been notified of by the respective primary sites 102(1) to 102(3) up to that time. The minimum of the maximum CSN values is referred to as a "Consistent Point" ("CP") value. Thus, at time T0, the most highest value CSN known to standby sites 104(1) and 104(2) is null value "*". Based on the commit action redo log 106C(3) received from primary site 102(3) for transaction Trx1, standby site 104(3) is aware of a maximum CSN value of CSN1. Accordingly, in the example of FIG. 4C, at time T0, the CP value (i.e., minimum of all the maximum CSN values observed in received commit action redo logs by each of the standby sites 104(1), 104(2) and 104(3) up to that time) is the null value "*", as neither of the primary sites 104(1) or 104(2) have received a CSN value. Each of the respective standby sites 104(1) to 104(3) can determine if that site can commit any of the transactions that is has received a CSN number in respect of by comparing those received CSN numbers to the CP value. In the illustrated example of FIG. 4C, at time T0, standby sites 104(1) and 104(2) have no pending transactions with CSN numbers. Standby site 104(3) has received notification of CSN1, however CSN1 is greater than the CP value="*" for the group of standby sites 104(1) to 104(3), so standby site 104(3) elects to not commit Trx1 at time T0. In example where a standby coordinator 422 is present, the standby coordinator can collect the information required to determine the CP value and then disseminate that information to the respective standby sites 104(11) to 104(3). In examples where there is no standby coordinator, the standby sites 104(1) to 104(3) can collect the information required to determine the CP value directly or indirectly from each other.

In FIG. 4C, at time T1, each of the first and second standby sites 104(1), 104(2) receive respective redo log messages that respectively include commit action redo logs 106C(1) and 106C(3) from first and second primary sites 102(1), 102(2), for transaction Trx2, along with CSN value CSN3. This indicates that first and second primary sites 102(1), 102(2) have each committed transaction Trx2 and that transaction Trx2 has been assigned a CSN=3 by the primary site coordinator 122. The maximum CSN value observed at the standby sites 104(1) to 104(3) is CSN3, CSN3 and CSN1, respectively, Thus, at time T1, the minimum maximum CSN is CSN=1, and thus the CP value is CP=1. Each of standby sites 104(1) and 104(2) will determine that the CSN values of their respective transactions are greater than the current CP=1 value, and will elect to not commit any transactions. However, standby site 104(3) will determine that the transaction Trx1:CSN1 that it has not yet committed locally has a CSN value that is less than or equal to the current CP=1 value, and thus standby site 102(3) will elect to commit transaction Trx1.

In FIG. 4C, at time T2, third standby site 104(3) receives a further redo log message 112(3) that includes commit action redo log 106C(3) from third primary site 102(3), indicating that transaction Trx4 can been committed at third primary site 102(3) and assigned a CSN value of CSN6. Thus, at time T2, the minimum of the maximum CSNs that the standby sites 104(1) to 104(3) have each received with commit action redo logs is CSN=3, so the CP value at time T2 is CP=3. Standby sites 104(1) and 104(2) can decide to commit transaction Trx2:CSN3 as CSN=3 is equal to or less than CP=3. Standby site 104(3) will hold off committing Trx4:CSN6 as CSN=6 is greater than CP=3.

Figure 4D:
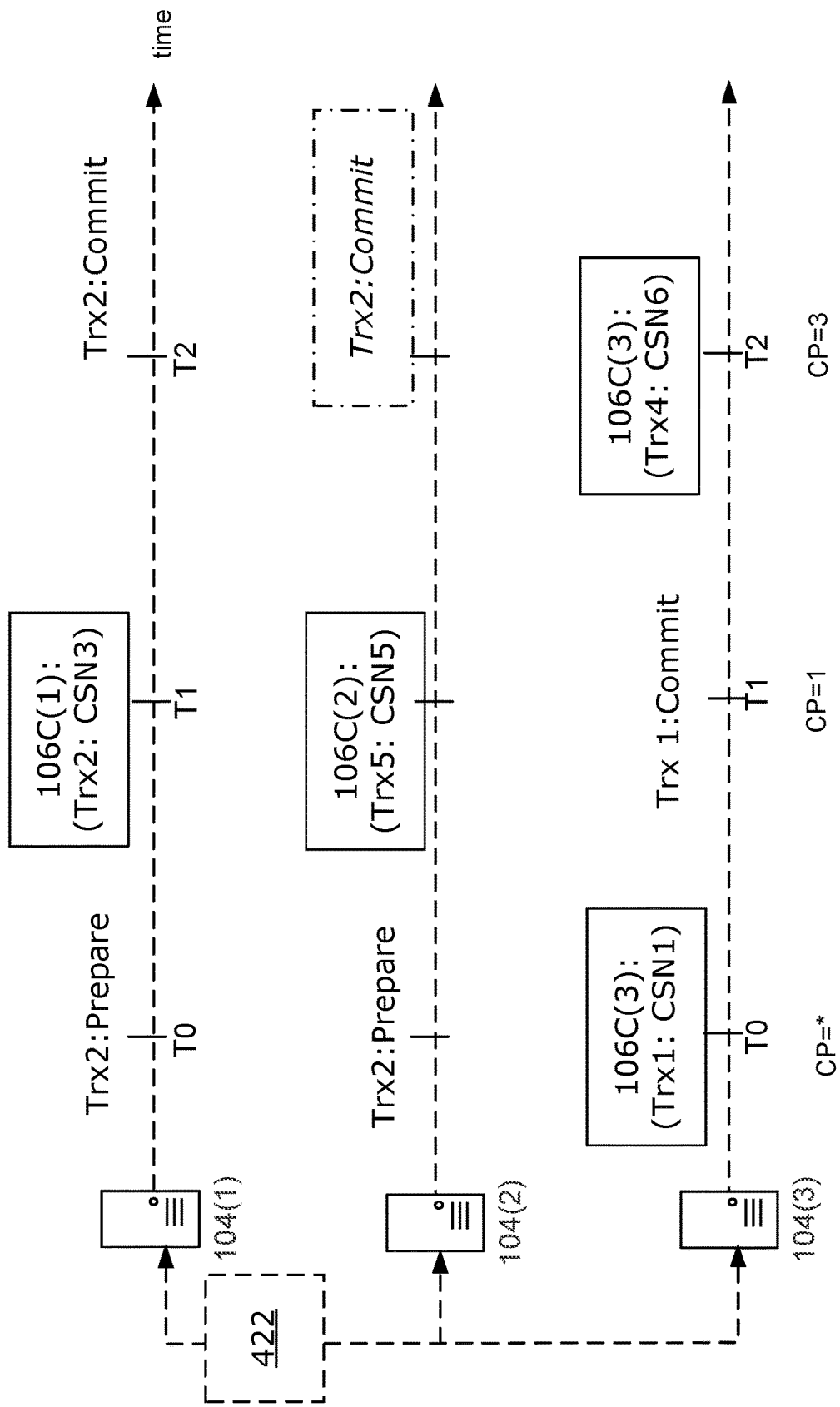
FIG. 4D illustrates a further example of redo logs updates received at a plurality of standby sites at different times.

FIG. 4D illustrates an example where redo log messages identifying committed transactions and their assigned CSNs are received at standby sites 104 in an order different than an order that corresponding transactions are committed at primary sites 102. FIG. 4D is similar to FIG. 4C except that at time T1, instead of receiving a message for commit action redo log 106C(2) at standby site 104(2) identifying Trx2:CSN3, standby site 104(2) receives a commit action redo log 106C(2) for a transaction Trx5 that has been assigned a CSN value of CSN5. In this case, although a transaction Trx2 with CSN3 is committed before a transaction Trx5 with CSN 5 at the primary site 102(2), the commit action redo log corresponding to Trx5:CSN5 is received at the second standby site 104(2) prior the commit action redo log corresponding to Trx2:CSN3. Thus, at time T2, the CP value will be CP=3. Standby site 104(1) can commit transaction Trx2:CSN3 as CSN=3 is equal to or less than CP=3. Standby site 104(3) will hold off committing Trx4:CSN6 as CSN=6 is greater than CP=3. Standby site 104(2) will hold off committing Trx5:CSN5 as CSN=5 is greater than CP=3.

The treatment of transaction Trx2 by standby site 104(2) will now be described. It will be noted in the example of FIG. 4D that standby site 104(2) has received, from its primary site 102(2), a redo log message for an action (but not a commit action) for transaction Trx2 at time T0. This indicates that the primary site 102(2) is at least in the prepare phase in respect of transaction Trx2 at time T0. However, by time T2, standby site 104(2) has not yet received a commit action redo log with a CSN value for transaction Trx2 from its primary site 104(2). As noted above, first standby site 104(1), which is also involved in transaction Trx2, can commit Trx2:CSN3 as it has received the commit action redo log for transaction Trx2, including Trx2:CSN3 (and CSN3<=CP=3). In some examples, the combination of: (i) second standby site 104(2) receiving a prepare-phase action redo log for Trx2 at time T0, (ii) second standby site 104(2) receiving a commit action redo log at time T1 for transaction Trx5:CSN5; and (iii) first standby site 104(1) receiving a commit action redo log at time T2 for transaction Trx2:CSN3, can be interpreted to indicate that second standby site 104(2) can also commit transaction Trx2 at Time T2 even though the commit action redo log update for transaction Trx2 has not been received by second standby site 104(2).

Thus, in at least some examples that include 2PC transactions, the theorem noted above can be extended to include transactions that have been prepared on multiple standby sites, but for which a CSN number has only been received at one or some, but not all of the standby sites. In such cases, the theorem of atomicity and dependency correctness for the use a CSN based transaction log stream tracking method can be stated as follows: For a 2PC transaction TrxA with a CSN value of X, if every standby site in a group of standby sites has seen a maximum CSN at least as large as X and at least one standby site in the group has seen the CSN value of X, then the 2PC transaction TrxA can be committed at all standby sites that have prepared for transaction TRxA.

Accordingly, in an example embodiments, standby sites 104(1) to 104(3) each track a current global CP, which they can each use to determine whether to commit transactions for which they have received redo logs in respect of.

Figure 4E:
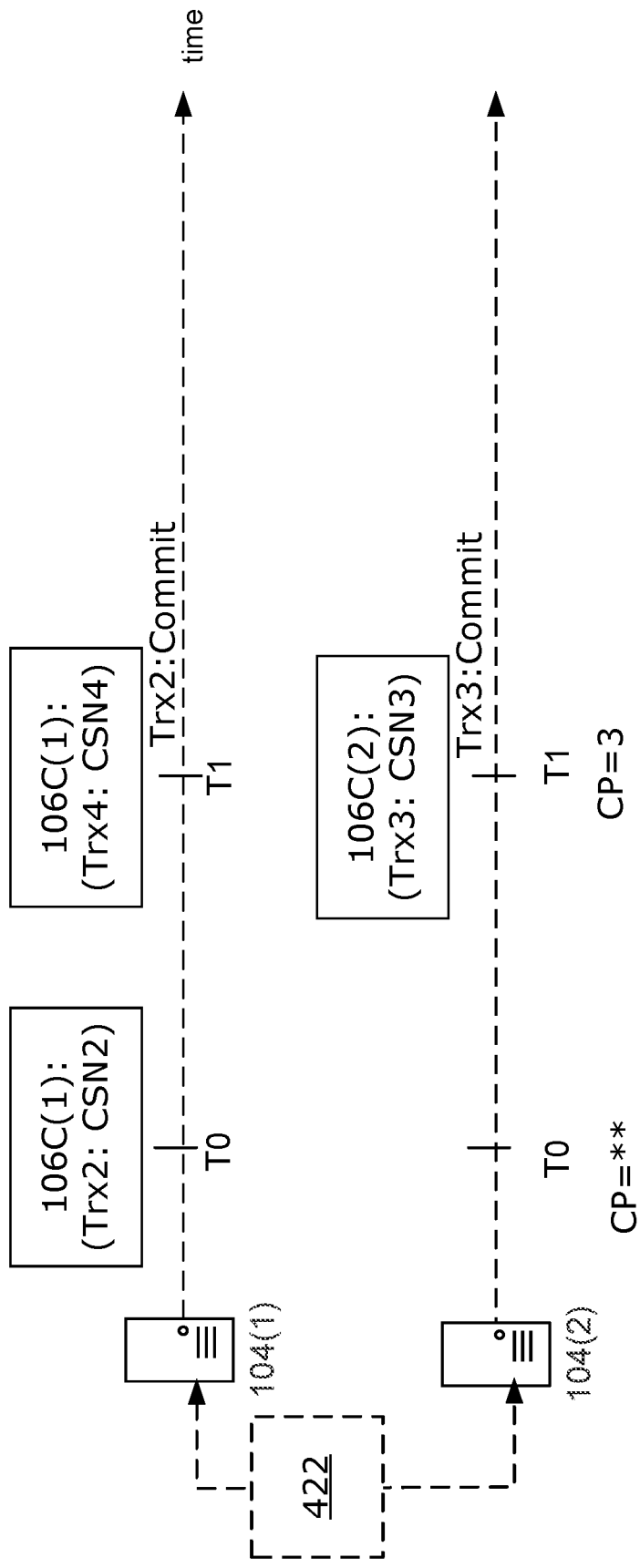
FIG. 4E illustrates a further example of redo logs updates received at a plurality of standby sites at different times.

FIG. 4E illustrates a further example of CP based processing in the context of single site transactions committed at respective primary sites. In this example, distributed database system 100 includes a group of two primary sites 102(1), 102(2) (not shown in FIG. 4E) and their respective first and second standby sites 104(1)-(2). In the illustrated example, transactions Trx2, Trx3 and Trx4 are committed at primary sites. Transactions Trx2, Trx4 are performed at primary site 102(1) and assigned CSN's 2, and 4 respectively by primary coordinator 122. Transactions Trx3 is performed at primary site 102(2) and assigned CSN's 3. At time T0, the first standby site 104(1) receives a redo log message 112(1) that includes commit action redo log 106C(1) for transaction Trx2 with a CSN value of CSN2. At time T1, the first standby site 104(1) receives a message that includes commit action redo log 106C(1) for transaction Trx4 having a CSN value of CSN4, and the second standby site 104(2) receives a message that includes commit action redo log 106C(2) for transaction Trx3 having a CSN value of CSN3. Thus, at time T1, the current CP value is CP=3. At time T1, first standby site 102(1) has two transactions that are waiting to be committed, namely transaction Trx2 (with CSN2) and transaction Trx4 (with CSN4). Given that the CSN value, CSN2, for transaction Trx2 is less than the current CP=3, but the CSN value, CSN4, for Trx4 is greater than current CP=3, at time T1 first standby site 102(1) will commit transaction Trx2, but will delay committing transaction Trx 4. For second standby site 104(2), the CSN value of CSN3 for transaction 3 is equal to or less than less than current CP=3, and accordingly standby site 104(2) will commit transaction Trx3.

Two solutions for tracking the position of transactions in a transaction stream have been described above. In one solution, an SDV based Lamport clock approach is applied in which a vector at each primary site is used to store information about the relative position of all sites in the transaction stream, with the local LSN's of commit actions indicating relative transaction offsets within the transaction stream. In a second solution, a transaction ID and CSN assigned by a coordinator is used to indicate the offset of a transaction in the transaction stream. In a further example, a hybrid solution that relies on both SDVs and transaction ID/CSN pairs may be employed. For example, the distributed computer system, 100 may be configured to provide to levels of standby processing based on importance of the transactions being backed up. In such examples, transactions may be categorized by primary sites and/or primary coordinator 122 as "normal" transactions" or "important transactions" based on predetermined importance criteria or threshold. The criteria may, for example, be defined based on one or more of the identity of the parties participating in a transaction, the size of the transaction, the nature of the items represented in the transaction, and/or other criteria and combinations thereof. In the case of normal transactions that fall below the importance criteria or threshold, transaction stream tracking may be performed based only on transaction ID/CSN values. In the case of important transactions that meet or exceed the importance criteria, transaction stream tracking may be performed both at the primary and standby site sides of database system 100 using both transaction ID/CSN values and SDV's. For example, upon becoming aware that an important transaction is being prepared at one or more primary sites, SDV tracking can be added in respect of the important transaction and other transactions that occur within a defined time vicinity of the important transaction. The additional SDV information can be sent in the site specific commit action redo logs, along with the CSN value assigned to the committed transaction. In the event that the transaction CSN values (and resulting CP value) does not support a standby update for an important transaction to be processed, then reference could be made by a standby site to the SDV information, which may enable the transaction to be properly backed up.

Figure 5:
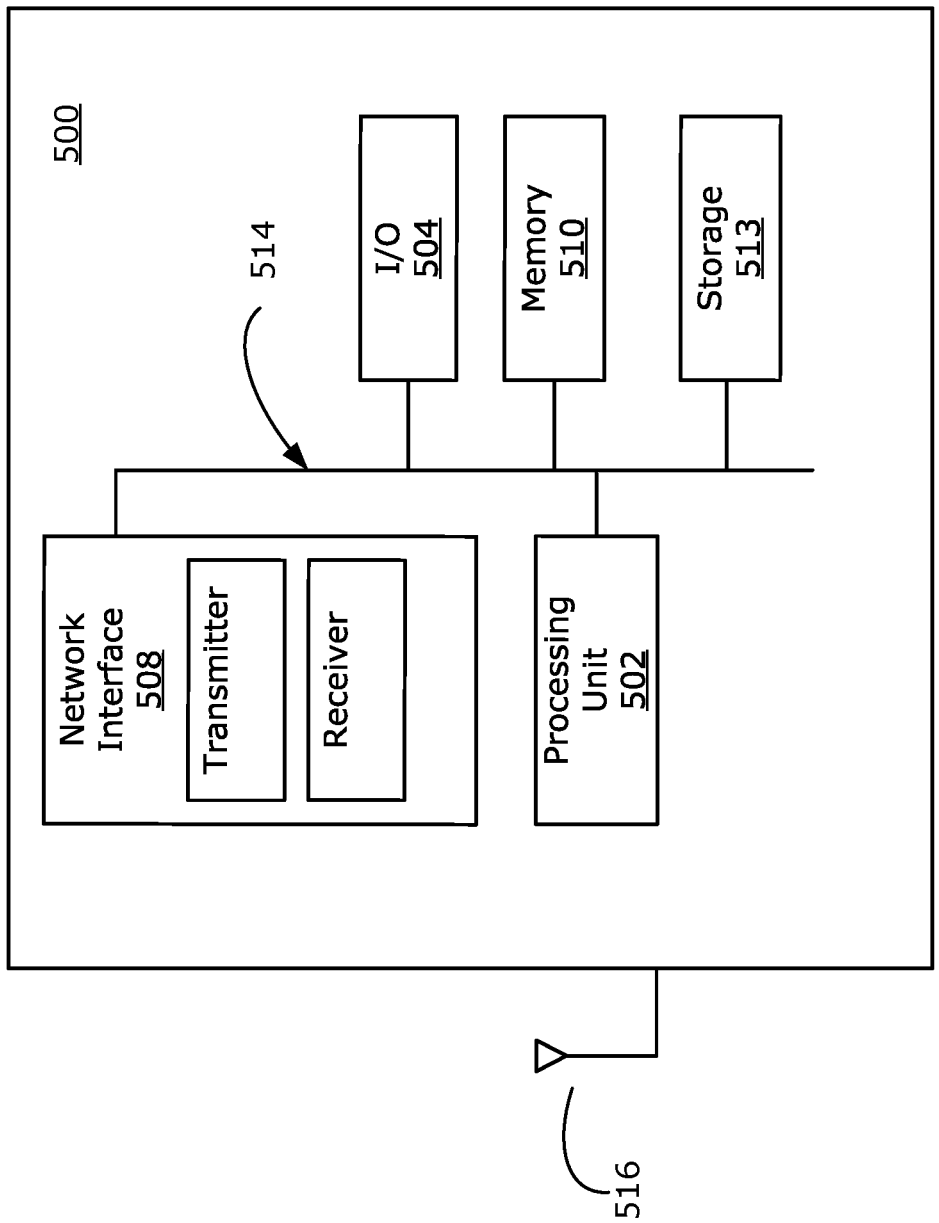
FIG. 5 is a block diagram illustrating a processing system which may be used in one or more primary sites of FIGS. 1-4A, or one or more standby sites of FIGS. 1, 4C-4E, or one or more coordinators, according to example embodiments.

FIG. 5 illustrates an example processing system 500, which may be used to implement methods and systems described herein, such as instances of primary sites 102, standby sites 104, coordinator 122, and coordinator 422 in a distributed computer system such as database system 100. Other processing systems suitable for implementing the methods and systems described in the present disclosure may be used, which may include components different from those discussed below. Although FIG. 5 shows a single instance of each component, there may be multiple instances of each component in the processing system 500.

The processing system 500 may include one or more processing units 502, such as a processor, a microprocessor, an application-specific integrated circuit (ASIC), a field-programmable gate array (FPGA), a dedicated logic circuitry, or combinations thereof. The processing system 500 may also include one or more input/output (I/O) interfaces 514, which may enable interfacing with one or more appropriate input devices and/or output devices (not shown). One or more of the input devices and/or output devices may be included as a component of the processing system 500 or may be external to the processing system 500. The processing system 500 may include one or more network interfaces 508 for wired or wireless communication with a network. In example embodiments, network interfaces 508 include one or more wireless interfaces such as transmitters that enable communications in a network. The network interface(s) 508 may include interfaces for wired links (e.g., Ethernet cable) and/or wireless links (e.g., one or more radio frequency links) for intra-network and/or inter-network communications. The network interface(s) 508 may provide wireless communication via one or more transmitters or transmitting antennas, one or more receivers or receiving antennas, and various signal processing hardware and software. In this regard, some network interface(s) 508 may include respective processing systems that are similar to processing system 500. In this example, a single antenna 516 is shown, which may serve as both transmitting and receiving antenna. However, in other examples there may be separate antennas for transmitting and receiving.

The processing system 500 may also include one or more storage devices such as storage units 513, which may include a non-transitory storage unit such as a solid state drive, a hard disk drive, a magnetic disk drive and/or an optical disk drive. The storage devices of processing system 500 may include one or more memories 510, which may include a volatile or non-volatile memory (e.g., a flash memory, a random access memory (RAM), and/or a read-only memory (ROM)). The storage devices (e.g., storage units 513 and/or non-transitory memory(ies) 510) may store instructions for execution by the processing device(s) 502, such as to carry out the present disclosure. The memory(ies)

510 may include other software instructions, such as for implementing an operating system and other applications/functions. In some examples, one or more data sets and/or module(s) may be provided by an external memory (e.g., an external drive in wired or wireless communication with the processing system 500) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 514 providing communication among components of the processing system 500, including the processing device(s) 502, I/O interface(s) 504, network interface(s) 508, storage unit(s) 513, and memory(ies) 510. The bus 514 may be any suitable bus architecture including, for example, a memory bus, a peripheral bus or a video bus.

In some examples, the processing system 500 may be applied in each of the primary sites 102 as discussed in the examples of FIGS. 1-4E. If there is change made to the primary site 102, the redo log 106 including the vector 108 made of LSNs to indicate transaction offsets of each associated primary site may be stored in the storage units 513 or the memories 510. In the case where CSNs are used to record the committed transaction at primary sites 102, the storage units 513 or the memories 510 may store the redo log 106 that includes an assigned relationship identifying each committed transaction ID corresponds to a CSN. The primary site 102 continuously sends updates regarding the stored redo log 106 to a corresponding standby site via the network interface 508, in order to support data backup that will enable asynchronous data recovery.

In some examples, the processing system 500 may be applied in each of the standby sites 104 as discussed in the examples of FIGS. 1-4E. The standby sites 104 receives the transmitted updates to redo log 106 via the network interface 508, and determine whether replay the received redo log 106 or roll back the received redo log 106 using the processing device 502.

In some applications, a processing system 500 may be used to implement a primary coordinator 122 and/or standby coordinator 122' to coordinate actions between primary sites and standby sites, respectively. In at least one configurations, prior to making changes (e.g., committing transactions) at primary sites, the primary coordinator 122 determines which primary sites and how many primary sites are involved in a transaction or participate in an transaction by using the processing device 502. In that way, the number of LSNs in a SDV 108 is therefore determined based on the number of primary sites to participate in the transaction.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for managing asynchronous data recovery in a distributed database system comprising:
   generating, by a first primary site that is included in a group of primary sites of the distributed database system, a commit action redo log message for a commit action performed by the first primary site for a first database transaction, the commit action redo log message including a transaction ID for the first database transaction and a transaction order indicator that represents an order of database transactions in a group of database transactions performed at one or more primary sites of the group of primary sites; and
   sending, by the first primary site, the commit action redo log message, for a corresponding first standby site included in a group of standby sites that backs up the first primary site, the commit action redo log message tracking a progress of actions performed by other standby sites in the group of standby sites with respect to one or more transaction dependency relationships among the group of standby sites used to determine when one or more dependent transactions have been committed on other standby sites and used to determine when to commit the first database transaction at the first standby site.

2. The method of claim 1 wherein the transaction order indicator includes a vector that comprises a respective log sequence number for each of the primary sites in the group of primary sites, the log sequence number for each of the primary sites corresponding to a commit action performed by the respective primary site.

3. The method of claim 2 comprising:
   receiving, at the first primary site, the log sequence numbers corresponding to the commit actions performed by other primary sites in the group of primary sites;
   wherein the log sequence number included in the transaction order indicator for each primary site corresponds to the last commit action performed by the primary site as known to the first primary site.

4. The method of claim 3 comprising:
receiving, by the first primary site, notification of the transaction ID for the first database transaction from a coordinator that assigns incremental transaction IDs to database transactions; and
providing, by the first primary site, notification for the coordinator that the first primary site is prepared to commit the first database transaction;
wherein the log sequence numbers corresponding to the commit actions performed by the other primary sites in the group of primary sites are received by the first primary site from the coordinator.

5. The method of claim 2 comprising:
receiving, at the first standby site, the commit action redo log message and determining based on the log sequence numbers included in the transaction order indicator when to commit the first database transaction.

6. The method of claim 1 wherein the transaction order indicator includes a commit sequence number assigned by a coordinator to the first database transaction that indicates when the first database transaction is committed at one or more of the primary sites relative to other database transactions included in the group of database transactions.

7. The method of claim 6 comprising:
receiving, at the first standby site, the commit action redo log message and determining, based on a comparison of the commit sequence number assigned to the first database transaction with commit sequence numbers included in further commit action redo log messages received at other standby sites, when to commit the first database transaction.

8. The method of claim 7 wherein the comparison comprises comparing the commit sequence number assigned to the first database transaction to a consistent point value, wherein the consistent point value is a minimum commit sequence number of a group that comprises a maximum commit sequence number received at each of the standby sites that correspond to the group of primary sites.

9. The method of claim 1 wherein:
when the first database transaction falls below an importance criteria, the transaction order indicator includes a commit sequence number assigned by a coordinator to the first database transaction that indicates when the first database transaction is committed at one or more of the primary sites relative to other database transactions included in the group of database transactions; and
when the first database transaction exceeds the importance criteria, the transaction order indicator includes:
(i) the commit sequence number assigned by the coordinator to the first database transaction and (ii) a vector that comprises a respective log sequence number for each of the primary sites in the group of primary sites, the log sequence number for each of the primary sites corresponding to a commit action performed by the respective primary site.

10. A first primary site included in a group of primary sites that participate in database transactions, comprising:
a processing system comprising one or more processing units and one or more storage devices storing instructions that are operable, when executed by the one or more processing units, to cause the first primary site to perform operations comprising:
generating a commit action redo log message for a commit action performed by the first primary site for a first database transaction, the commit action redo log message including a transaction ID for the first database transaction and a transaction order indicator that represents an order of database transactions in a group of database transactions performed at one or more primary sites of the group of primary sites; and
sending the commit action redo log message for a corresponding first standby site included in a group of standby sites, that backs up the first primary site, the commit action redo log message tracking a progress of actions performed by other standby sites in the group of standby sites with respect to one or more transaction dependency relationships among the group of standby sites used to determine when one or more dependent transactions have been committed on other standby sites and used to determine when to commit the first database transaction at the first standby site.

11. The first primary site of claim 10 wherein the transaction order indicator includes a vector that comprises a respective log sequence number for each of the primary sites in the group of primary sites, the log sequence number for each of the primary sites corresponding to a commit action performed by the respective primary site.

12. The first primary site of claim 11 wherein the instructions, when executed by the one or more processing units, cause the first primary site to perform operations comprising:
receiving, at the first primary site, the log sequence numbers corresponding to the commit actions performed by other primary sites in the group of primary sites;
wherein the log sequence number included in the transaction order indicator for each primary site corresponds to the last commit action performed by the primary site as known to the first primary site.

13. The first primary site of claim 12 wherein the instructions, when executed by the one or more processing units, cause the first primary site to perform operations comprising:
receiving, by the first primary site, notification of the transaction ID for the first database transaction from a coordinator that assigns incremental transaction IDs to database transactions; and
providing, by the first primary site, notification for the coordinator that the first primary site is prepared to commit the first database transaction;
wherein the log sequence numbers corresponding to the commit actions performed by the other primary sites in the group of primary sites are received by the first primary site from the coordinator.

14. The first primary site of claim 10 wherein the transaction order indicator includes a commit sequence number assigned by a coordinator to the first database transaction that indicates when the first database transaction is committed at one or more of the primary sites relative to other database transactions included in the group of database transactions.

15. The first primary site of claim 14 wherein the instructions, when executed by the one or more processing units, cause the first primary site to perform operations comprising:
receiving, at the first standby site, the commit action redo log message and determining, based on a comparison of the commit sequence number assigned to the first database transaction with commit sequence numbers included in further commit action redo log messages received at other standby sites, when to commit the first database transaction.

16. The first primary site of claim 15 wherein the comparison comprises comparing the commit sequence number assigned to the first database transaction to a consistent point value, wherein the consistent point value is a minimum commit sequence number of a group that comprises a maximum commit sequence number received at each of the standby sites that correspond to the group of primary sites.

17. A method performed at a first standby site that backs up a first primary site in a distributed database system that includes a group of primary sites each having respective standby sites, the method comprising:

receiving a redo log message at the first standby site included in a group of standby sites, in respect of a first transaction performed at the first primary site, the redo log message including a transaction ID for the first transaction and a first transaction order indicator that indicates an order of the first transaction in a group of transactions committed at the group of primary sites;

receiving information at the first standby site about transaction order indicators received at other standby sites, the transaction order indicators tracking one or more transaction dependency relationships among the group of standby sites;

determining, based on the redo log message and the information about transaction order indicators received at other standby sites, a progress of actions performed by other standby sites with respect to one or more transaction dependency relationships among the group of standby sites, the progress of actions indicating when one or more dependent transactions have been committed on other standby sites; and determining, based on the progress of actions, when to commit the first transaction at the first standby site.

18. The method of claim 17 wherein each transaction order indicator includes a vector that comprises a respective log sequence number for each of the primary sites in the group of primary sites, the log sequence number for each of the primary sites corresponding to a commit action performed by the respective primary site.

19. The method of claim 17 wherein the first transaction order indicator includes a commit sequence number for the first transaction that indicates when the first database transaction was committed at one or more of the primary sites relative to other database transactions included in the group of database transactions, and the transaction order indicators received at the other standby sites each indicate commit sequence numbers for transactions committed at the primary sites that correspond to the other standby sites.

20. The method of claim 19 comprising determining a consistent point value, wherein the consistent point value is a minimum commit sequence number of a group that comprises a maximum commit sequence number received at each of the standby sites that correspond to the group of primary sites, wherein determining when to commit the first transaction at the first standby site is based on comparison of the commit sequence number for the first transaction with the consistent point value.

\* \* \* \* \*